United States Patent
Taillandier et al.

(10) Patent No.: US 12,387,432 B2
(45) Date of Patent: Aug. 12, 2025

(54) SYSTEMS AND METHODS TO ACCELERATE COLLISION DETECTION IN CLOTH SIMULATION

(71) Applicant: Electronic Arts Inc., Redwood City, CA (US)

(72) Inventors: Robin Taillandier, Sundbyberg (SE); Andrea Ferrario, Stockholm (SE); Simon Gomer, Stockholm (SE); Leo Taslaman, Stockholm (SE); Masatoshi Matsumiya, Sayama (JP)

(73) Assignee: Electronic Arts Inc., Redwood City, CA (US)

( * ) Notice: Subject to any disclaimer, the term of this patent is extended or adjusted under 35 U.S.C. 154(b) by 389 days.

(21) Appl. No.: 18/129,135

(22) Filed: Mar. 31, 2023

(65) Prior Publication Data

US 2024/0331301 A1     Oct. 3, 2024

(51) Int. Cl.
     *G06T 17/20*      (2006.01)
(52) U.S. Cl.
     CPC ........ *G06T 17/205* (2013.01); *G06T 2210/16* (2013.01)
(58) Field of Classification Search
     CPC .......................... G06T 17/205; G06T 2210/16
     See application file for complete search history.

(56) References Cited

U.S. PATENT DOCUMENTS

| | | | | |
|---|---|---|---|---|
| 2002/0196258 | A1* | 12/2002 | Lake | G06T 13/40 345/474 |
| 2008/0129739 | A1* | 6/2008 | Moravanszky | G06T 13/20 345/474 |

FOREIGN PATENT DOCUMENTS

CN      112581602      *   3/2021      ............. G06T 17/00

OTHER PUBLICATIONS

AnanDEV—Youtube (From Beginner to Pro: Mastering Unity's Colliders), URL: https://www.youtube.com/watch?v=qcGa_mzjc8Q, Jul. 28, 2023 (Year: 2023).*
Unity Technologies. "Colliders," *Unity User Manual* 2021.2 (Oct. 25, 2021).

* cited by examiner

*Primary Examiner* — Phuc N Doan
(74) *Attorney, Agent, or Firm* — Leydig, Voit & Mayer, Ltd.

(57) ABSTRACT

A body mesh to be collided with a cloth mesh are received, together with collider objects (that correspond to or approximate the body mesh) divided into cells. Polygons of the body mesh are projected onto the surface of the collider objects from a location within the collider object to identify cells of the collider object that overlap the projection of the polygons. A set of cloth features that collide with the collider object are projected onto the surface of the collider object to identify cells onto which the cloth features are projected. For each cell that includes a projection of a cloth feature, collision tests are performed between the cloth feature and the polygons whose projections also overlap the same cell. Using the collider object as an acceleration structure allows for cloth simulation to be performed while reducing collision tests for each cloth feature to a limited number of polygons.

17 Claims, 11 Drawing Sheets

SYSTEMS AND METHODS TO ACCELERATE COLLISION DETECTION IN CLOTH SIMULATION

FIELD

This disclosure generally relates to computer graphics and, more particularly, to systems and methods to accelerate collision detection in cloth simulation.

BACKGROUND

For three-dimensional (3D) graphics applications, such as video games or animated films, efficient processing of data by reducing computational complexity of a given operation is often useful. This is particularly the case in real-time applications, such as video games, where the length of time allowed for processing operations is limited.

Cloth simulation in video games is typically achieved using a physics engine that simulates the behavior of a flexible material, such as cloth. The simulation works by modeling the physical properties of the cloth, such as its mass, density, and elasticity, and then applying forces and constraints to simulate its behavior in response to external stimuli such as wind, gravity, or collisions.

Cloth is usually represented by a two-dimensional (2D) polygonal mesh embedded in 3D space for the purpose of simulation. Typically, an artist or game developer defines a topology of the cloth mesh, assigning physical properties to the cloth mesh, such as mass and density, and setting up any initial constraints, such as pinning points. Forces are applied to the cloth mesh to simulate the effects of gravity, wind, or other external forces, such as collisions. These forces are typically calculated based on the physical properties of the cloth mesh. Constraints may be applied to the cloth mesh to prevent the cloth mesh from stretching or tearing beyond certain limits.

The cloth mesh may be checked for collisions (e.g., interactions) with other objects, such as a player or the environment, which is referred to as collision detection. If a collision is detected, forces are applied to the cloth mesh to simulate the effects of the collision. The updated state of the cloth mesh is integrated into a graphics engine for the game or simulation, allowing the cloth mesh to inform what is rendered and displayed on a screen.

Cloth simulation in video games is a complex and computationally-intensive process that requires specialized knowledge and expertise in physics simulation and numerical methods. However, when done well, cloth simulation can add a significant level of realism and immersion to games and simulations.

Collisions and collision detection are important elements that contribute to the realism of cloth simulation in video games. Collision detection is itself also a computationally-intensive process, particularly when dealing with large numbers of objects or complex collision geometries. This can lead to slower frame rates and decreased overall performance in video games and simulations.

In video games, objects (such as the body of a character) are represented by polygonal meshes rendered in a scene. As such, the highest level of realism when it comes to collisions is obtained by having the cloth mesh interact with the polygonal mesh representing the object. This technique of collision with a mesh (mesh collision), however, is even more computationally expensive due to the large number of polygons usually present in both the cloth mesh and the body mesh, and the necessity of checking each pair of elements from these two sets for collision.

Some conventional approaches to accelerate collision detection utilize spatial acceleration structures to assist with collision detection. In general, a spatial acceleration structure is a three-dimensional invisible shape that represents an object and is used to detect when that object comes into contact with a cloth in a way that is computationally cheaper than performing a full collision detection using the body mesh.

In some instances, such as when using geometric shapes as acceleration structures, visual artifacts are introduced, since the collision is detected between the cloth and the geometric shape, and not directly with the underlying object that the geometric shape is meant to represent.

In other instances, three-dimensional acceleration structures are used as a first step in collision detection, by using three-dimensional subdivisions of a scene to limit the portion of the cloth mesh and the body mesh that needs to be checked for collision. However, in order to achieve good acceleration in collision detection, it is necessary to use a larger number of three-dimensional subdivision, which can be unwieldy.

In addition to the problem of detecting collision, it is also important for the purpose of a realistic simulation to apply a method to resolve these collisions between the cloth and other objects, i.e., determine how the interaction with the objects affect the behavior of the cloth. Existing collision resolution methods often struggle with determining the spatial configuration of the cloth with respect to the objects, for example, discriminating the portion of space within the object from the portion outside the object.

Simulation programs such as cloth simulation can be developed to be executed on a computer's central processing unit (CPU) or on its graphics processing unit (GPU). These two pieces of hardware have different architectures and characteristics.

In video games and other real-time applications, the cloth mesh responds dynamically to changes in the environment or to the actions of the player. Information about these changes can be stored in the computer's main memory (e.g., random access memory (RAM)), but is often stored in the video memory on a graphics card for use by a graphics processing unit (GPU). Traditional programs for cloth simulation executed on a central processing unit (CPU) are limited by their inability to access the data stored in the video memory in a given frame to create a more realistic simulation.

Existing GPU-based cloth simulation and mesh collision approaches producing high-fidelity results, such as used in offline animated film development, are far too computationally expensive for use in real-time applications.

As such, there remains a need in the art for an improved system and method for cloth simulation.

SUMMARY

Embodiments of the disclosure provide a method, device, and computer-readable storage medium for performing efficient handling of collisions with a mesh in the context of cloth simulation are disclosed. The method includes: receiving an input mesh, wherein the input mesh comprises a polygonal mesh that is a computer representation of a three-dimensional (3D) object; receiving a collider object, wherein the input mesh is fully enclosed by the collider object, and wherein a surface of the collider object is divided into a plurality of cells; receiving a cloth mesh, wherein the cloth mesh comprises a polygonal mesh that is a computer representation of a flexible material; identifying a set of cloth features such as vertices or polygons of the cloth mesh that intersect the collider object; for each polygon of the input mesh, projecting the polygon onto the surface of the collider object to identify a set of cells of the collider object that a projection of the polygon intersects; for each cloth feature in the set of cloth feature that intersects the collider object, projecting the cloth feature onto the surface of the collider object to identify a cell of the collider object that a projection of the cloth feature intersects; selecting a first cell of the plurality of cells of the collider object that is identified as including a projection of at least one cloth feature, wherein the first cell is also associated a set of polygons of the input mesh whose projections intersect the first cell; performing collision detection between the at least one cloth feature and the polygons in the set of polygons of the input mesh whose projections intersect the first cell to identify a first polygon collided with the at least one feature; and perform a collision handling operation between the at least one vertex and the first polygon.

In some embodiments, identifying the set of cloth features of the cloth mesh that intersect the collider object comprises: for each cloth feature of the cloth mesh, determining whether the cloth feature is enclosed by the surface of the collider object; and identifying the set of cloth features of the cloth mesh that intersect the collider object as the cloth features that are enclosed by the surface of the collider object.

In some embodiments, for each polygon of the input mesh, projecting the polygon onto the surface of the collider object to identify the set of cells of the collider object that the projection of the polygon intersects comprises: projecting vertices of the polygon from a location within the collider object towards the surface of the collider object to identify projected locations of the vertices of the polygon on the surface of the collider object; and identifying the set of cells of the collider object that the projection of the polygon intersects based on the projected locations of the vertices of the polygon.

In some embodiments, for each cloth feature in the set of cloth features that intersects the collider object, projecting the cloth feature onto the surface of the collider object to identify the cell of the collider object that the projection of the cloth feature intersects comprises: projecting the cloth feature from a location within the collider object towards the surface of the collider object to identify a projected location of the cloth feature on the surface of the collider object; and identifying the cell of the collider object that the projection of the cloth feature intersects based on the projected location of the cloth feature.

In some embodiments, performing the collision handling method comprises: moving a location of the at least one feature to an updated location on a face of the first polygon in a direction of a face normal of the first polygon; or moving a location of the at least one vertex to an updated location on a face of the first polygon in a direction of projecting the at least one feature from a location at a center of the collider object towards the surface of the collider object; or moving a location of the at least one feature to a closest point on the first polygon, wherein the closest point is on the face of the first polygon, on an edge of the first polygon, or at a vertex of the first polygon.

In some embodiments, the method further comprises: identifying one or more cells of the plurality of cells adjacent to the first cell; and performing collision detection between the at least one cloth feature whose projections intersect the first cell and polygons of the input mesh whose projections intersect the one or more cells of the plurality of cells adjacent to the first cell.

In some embodiments, the collider object comprises a box collider object, a sphere or spheroid collider object, or a capsule collider object.

DETAILED DESCRIPTION

Figure 1:
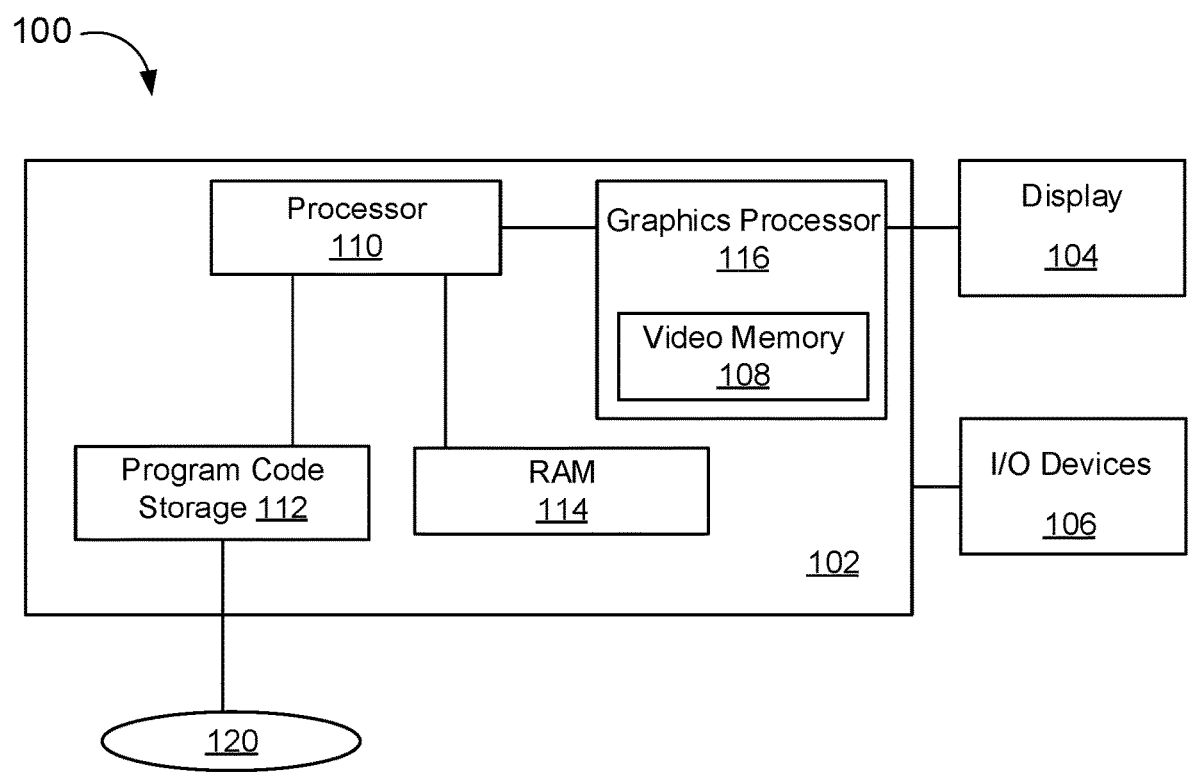
FIG. 1 is a block diagram of a computer system for executing simulation programs and rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

Embodiments of the disclosure provide a cloth simulation technique that uses colliders as acceleration structures to determine which polygons (e.g., triangles) of a character mesh are collided with a cloth mesh in a cloth simulation. The disclosed embodiments reduce the computational expense needed for cloth simulations, making it possible to be done in real-time, especially with a GPU. In addition, using the GPU enables the use of other GPU data (e.g., body deformations of the underlying object in contact with the cloth mesh) in the cloth simulations.

As discussed in greater detail herein, embodiments of the disclosure receive as input a body mesh to be collided with a cloth mesh, as well as collider objects (e.g., boxes, spheres, capsules, etc.) approximating the body mesh. The surface of each collider object is divided into a set of cells (e.g., surface elements (surfels)). In some implementations, the cells are two-dimensional elements (e.g., triangles or quadrilaterals). In some implementations, the collider object is divided into cells in a manner that makes it efficient to find the cell into which the projections of polygons and cloth features fall.

According to embodiments of the disclosure, the triangles of the body mesh are projected onto the surface of the collider object from a location within the collider object to identify the cells of the collider object that overlap the projection of the triangle. In some implementations, the projection is from a center of the collider object. Cloth vertices of a cloth mesh that are located within the collider object are identified. For the cloth vertices of the cloth mesh that are determined as being located within the collider object, embodiments of the disclosure project such vertices onto the surface of the collider object (e.g., from a location within the collider object, similar to how the triangles of the body mesh are projected) to identify which cell of the collider object is closest to the location of the cloth vertex. Then, for each cell identified as including a projection of cloth vertex that is collided with the collider object, embodiments of the disclosure perform vertex-triangle collision tests between the location of the cloth vertex and the locations of the triangles whose projections have been identified as overlapping the same cell. By using the cells of the collider object to cluster triangles of the body mesh and cloth vertices, embodiments of the disclosure limit the number of triangle-to-vertex collision tests that are performed for cloth simulation.

By using two-dimensional cells obtained by subdividing the two-dimensional surface of the collider object, instead of the usual technique of using three-dimensional subdivisions of three-dimensional acceleration structures, the number of subdivisions is drastically lowered, improving efficiency.

To further optimize performance, in some embodiments, a simplified substitution mesh can be used instead of the original body mesh to perform collision detection. Additionally, the quality of the body mesh can be tuned based in part on camera view or other level-of-detail (LOD) parameters to make the process efficiently scale to larger multi-player experiences (e.g., when the character is far from a location of the camera).

As such, the collider object is used as an acceleration structure to limit the number of collision detection operations that are performed against the triangles of the body mesh. Another advantage of the disclosed approach is that because the cells of the collider object are obtained by subdividing the 2D surface of the acceleration structure, it is less computationally expensive to cluster the triangles of the body mesh and vertices of the cloth mesh, as compared to using a 3D subdivision of an acceleration structure.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

The objects and entities in a scene may be animated by the game engine by performing simulations of physical phenomena, in order to represent a real phenomenon more realistically. For example, the animation of the garment of a character may be generated by the game engine by simulating the dynamics of the cloth as it would physically move due to the movement of the character.

Since the inputs to the simulations of physical phenomena, such as the movement of the character that in turn determines the movement of its garments, may depend on user input in the interactive video game, the simulation itself must be run in real time as the game progresses in order to react to user input; it is in general not possible to e.g. perform the simulation in advance and still produce a realistic behavior.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 (for example, a CPU) may include one or more processors having one or more processing cores. Similarly, although shown as one processor in FIG. 1, graphics processor 116 (for example, a GPU) may include one or more processors having one or more processing cores. Graphics processor 116 may also include a video memory 108.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
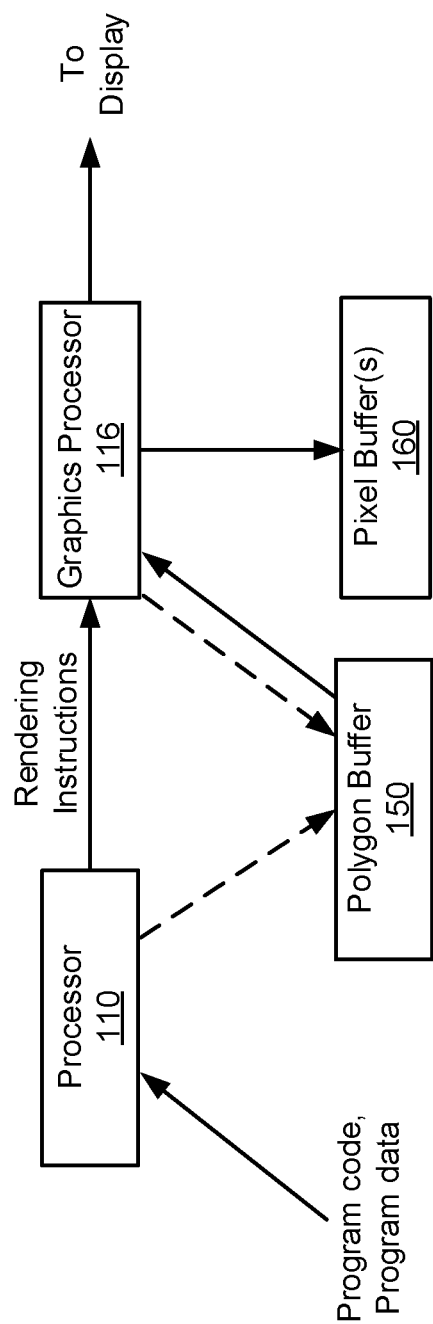
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
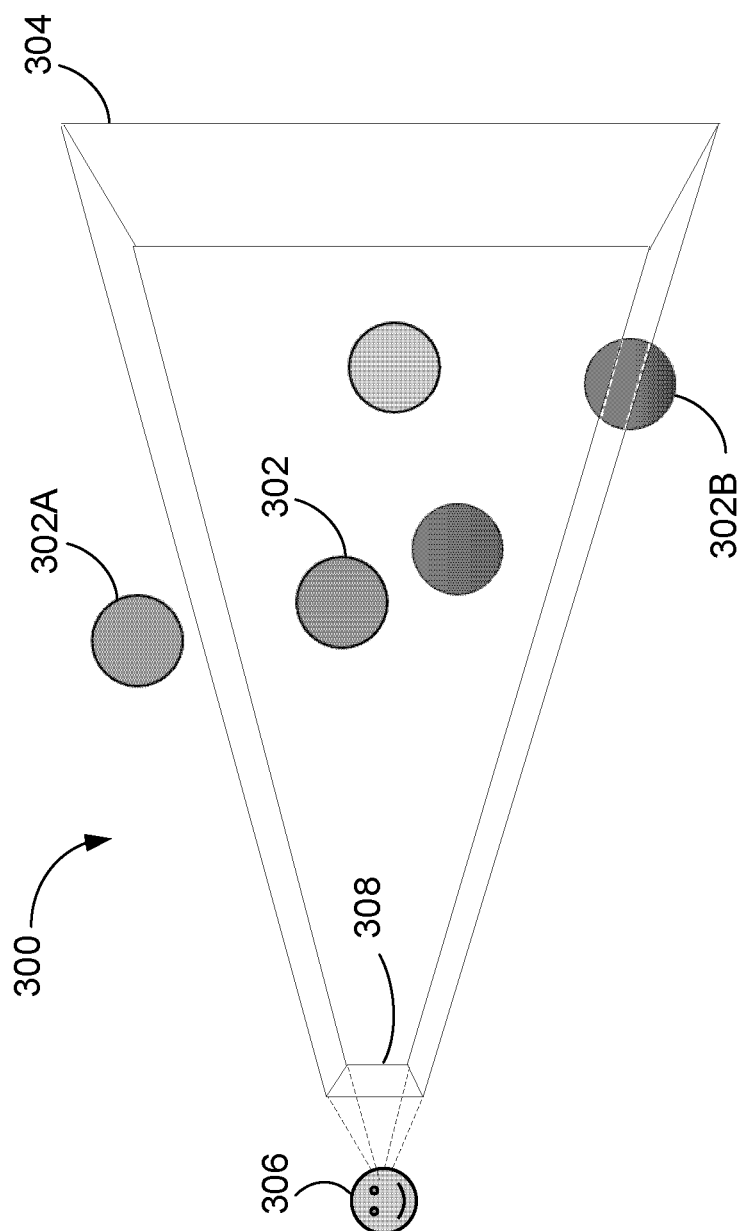
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

Figure 4B:
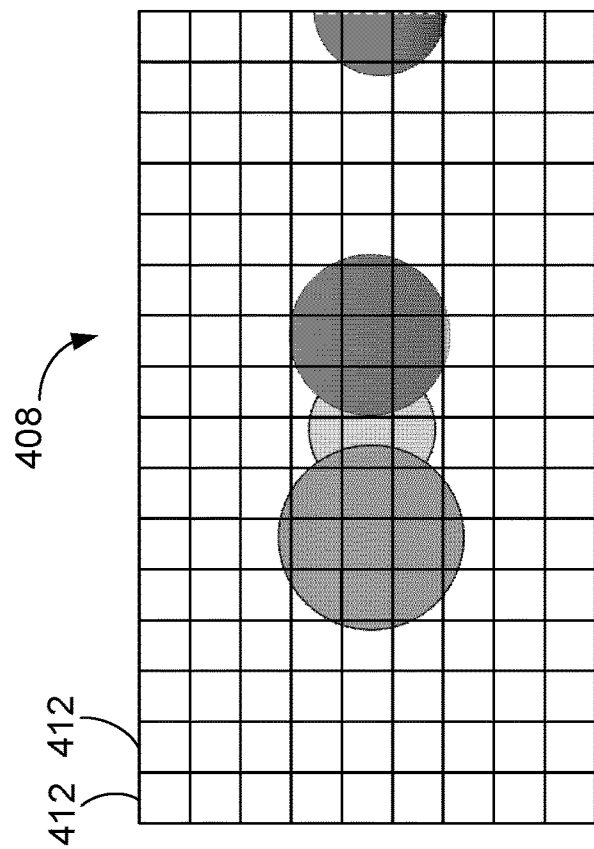
FIG. 4B is an example of an image of a scene, according to one embodiment.
Figure 4A:
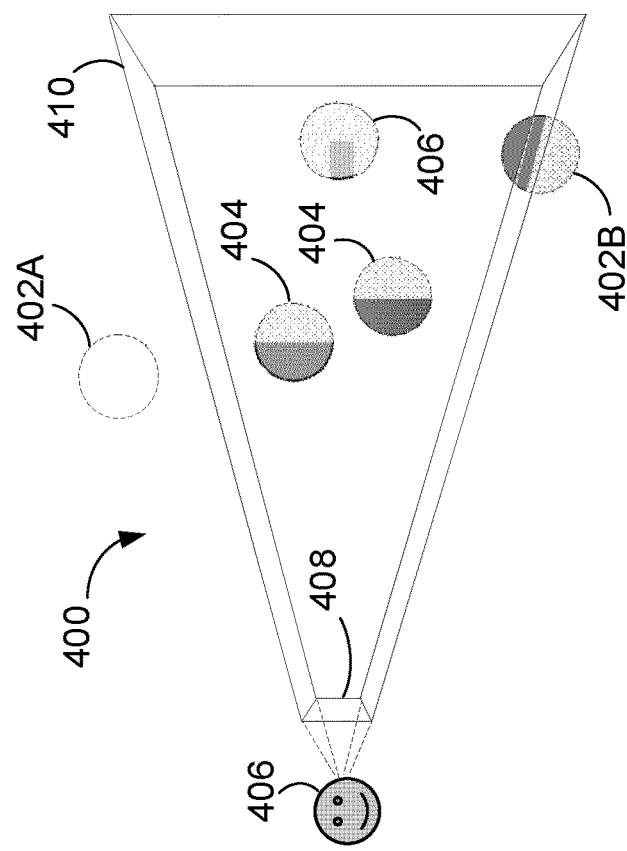
FIG. 4A is a block diagram illustrating rendering of a scene, according to one embodiment.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
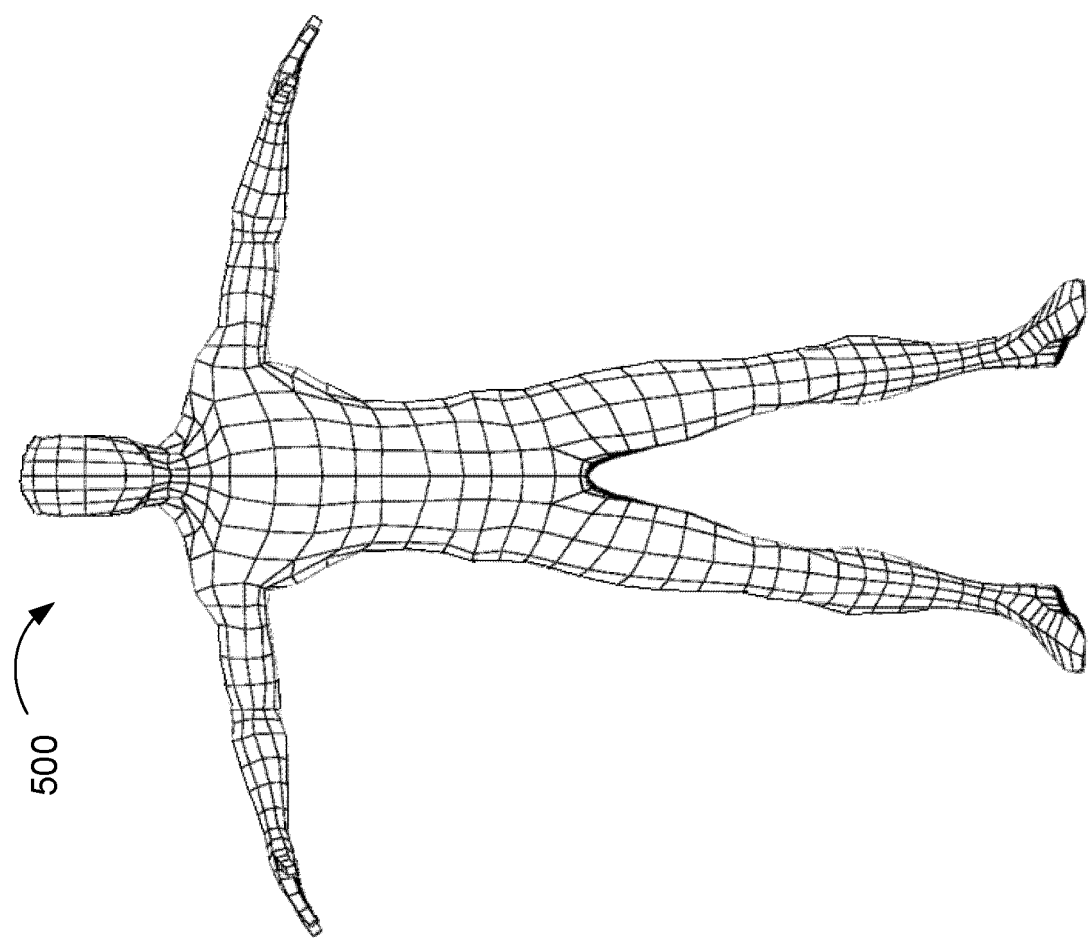
FIG. 5 is an example of a polygonal mesh, according to one embodiment.

FIG. 5 is an example of a polygonal mesh 500, according to one embodiment. As described, the polygonal mesh 500 may correspond to an artist-authored object. In the example shown, the object represents a human-like object. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles). In various embodiments, the polygonal mesh 500 may be comprised of one or more polygonal sub-meshes. Each sub-mesh may include a series of polygons.

Figure 6:
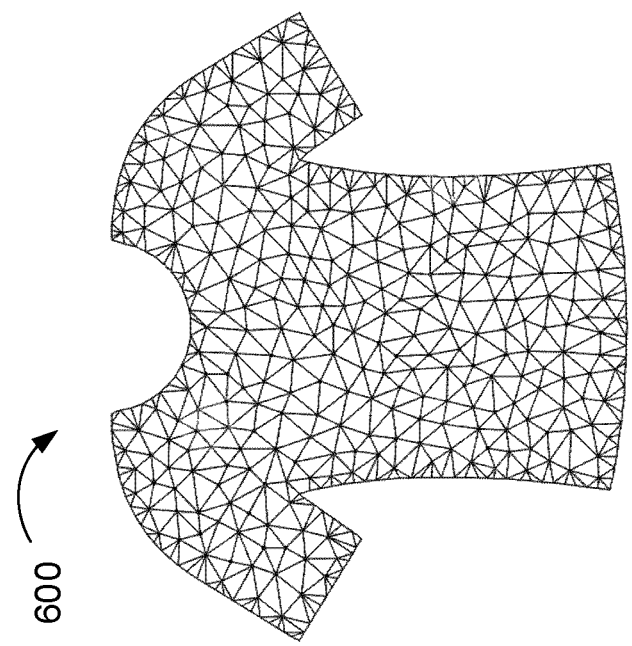
FIG. 6 is another example of a polygonal mesh, according to one embodiment.

FIG. 6 is another example of a polygonal mesh 600, according to one embodiment. The polygonal mesh 600 may correspond to an artist-authored object. In the example shown, the object represents a cloth mesh of a shirt to be worn by a character. The polygonal mesh 600 comprises a collection of vertices, edges, and faces that define the shape and/or boundary of the artist-authored object representing the cloth or flexible material. A few non-limiting examples of objects representing cloth or flexible material include clothing, paper, flags, curtains, towels, or skin, for example.

In one implementation, the polygonal mesh 500 in FIG. 5 of the human-like object comprises a body mesh with which the cloth mesh 600 in FIG. 6 may interact, for example, by colliding with each other.

As described herein, embodiments of the disclosure utilize collider objects as an acceleration structure for collision detection, e.g., between a body mesh (e.g., polygonal mesh 500 in FIG. 5) and a cloth mesh (e.g., polygonal mesh 600 in FIG. 6).

Figure 7:
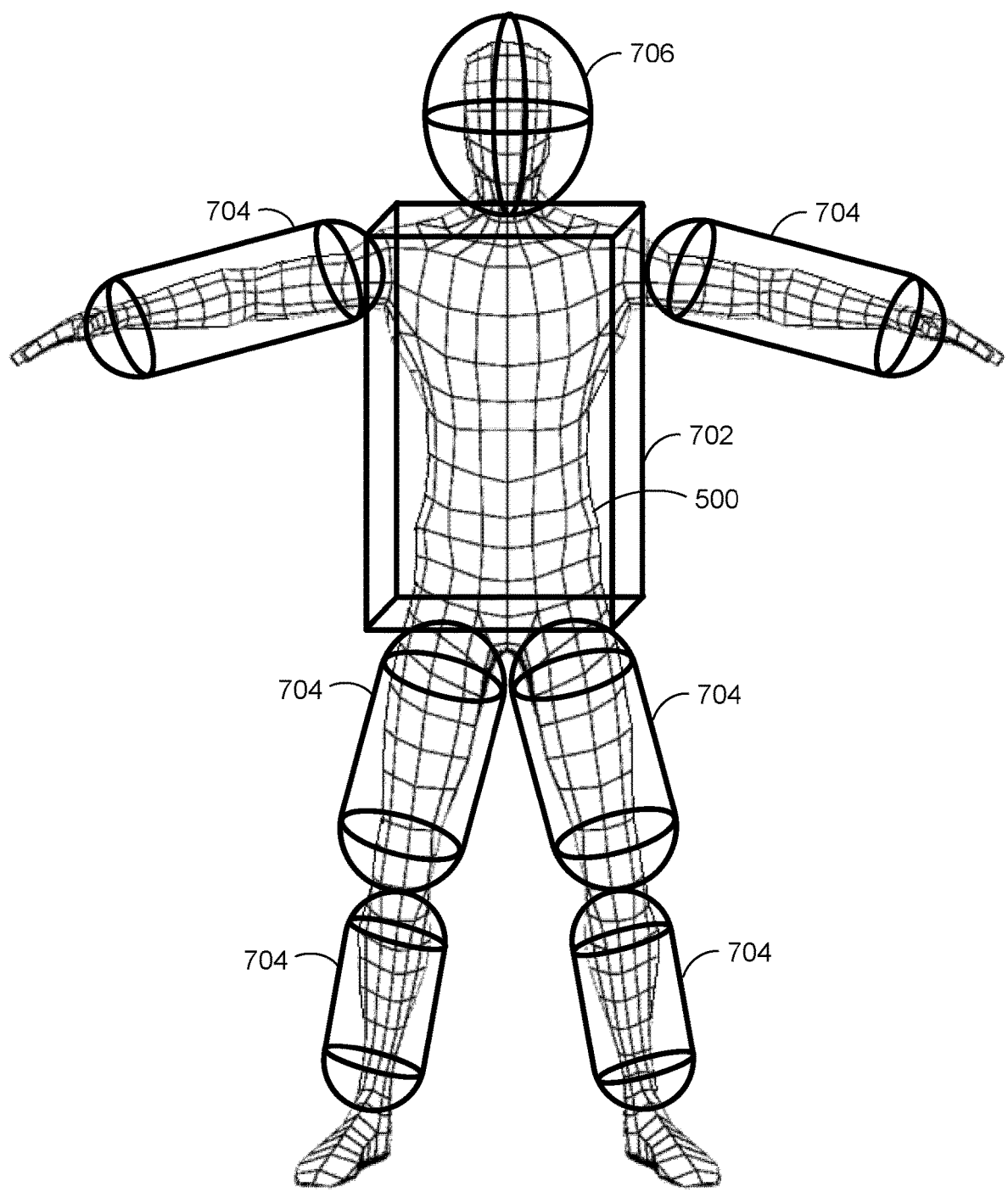
FIG. 7 is an example of a body mesh and corresponding collider objects, according to one embodiment.

FIG. 7 is an example of a body mesh and corresponding collider objects, according to one embodiment. The example in FIG. 7 shows the polygonal mesh 500 of the human-like object (i.e., the body mesh) and a set of collider objects 702, 704, 706 corresponding to the polygonal mesh 500.

A collider object is a type of geometrical shape that is used in 3D game development and simulation to detect collisions between objects. In general, a collider object is an invisible shape that surrounds or approximates an object (e.g., polygonal mesh 500) or portions of an object, and is used to detect when that object comes into contact with another object (e.g., a cloth mesh, such as the cloth mesh represented by the polygonal mesh 600 in FIG. 6).

A collider object is typically a simplified version of the object that it represents, comprising a geometric shape with a mathematical description. In some implementations, the collider objects are artist-authored to correspond to or approximate an artist-authored character.

In the disclosed embodiments, a set of collider objects is provided for an underlying body mesh. Each collider object is authored so that it fully encloses a portion of the underlying body mesh. For example, one collider object may be used for the head (e.g., collider object 706), another collider object may be used for the torso (e.g., collider object 702), and additional collider objects can be used for arms and legs (e.g., collider objects 704).

Collider objects can take on a variety of shapes. Some common shapes for collider objects are boxes, spheres or spheroids, and capsules.

Capsule collider objects (e.g., collider objects 704) are a type of collider object that is shaped like a cylinder with hemispherical caps on either end, similar to a pill or capsule. Capsule collider objects are commonly used in 3D game development and simulation to detect collisions between objects that have a cylindrical or humanoid shape, such as character body parts or weapons. The capsule collider object is a popular choice because it can accurately represent the shape of many objects in games and simulations, while being computationally efficient to use. The cylinder portion of the capsule collider can represent the body of an object, particularly arms or legs, as shown in the example in FIG. 7. Capsule colliders can be adjusted in size, length, and radius to fit the specific needs of a game or simulation. For example, a capsule collider with a shorter length and smaller radius might be used to represent a bullet or projectile, while a larger capsule collider might be used to represent portions of a character or a vehicle.

Other shapes for collider objects can also be used, each with its own advantages and disadvantages depending on the specific use case. Some common types of collider objects include a box collider (e.g., collider object 702), which is a collider object that can be used to represent objects with rectangular or box-shaped bounds, or a sphere or spheroid collider object (e.g., collider object 706), which can be used to represent objects with spherical or rounded bounds. Other types of collider objects are also within the scope of the disclosure, such as geometrical shapes representing the terrain. In general, the choice of collider object depends on the specific requirements of the game or simulation, such as the complexity of the objects involved, the desired accuracy of the collision detection, and the available computational resources.

According to the disclosed embodiments, collider objects can be used as an acceleration structure to perform collision detection between a cloth mesh and a body mesh corresponding to the collider objects.

In some embodiments, collider objects that are used to represent or approximate animated object, such as the body of animated characters, can themselves be animated so as to follow the movement and deformation of the objects they are representing. For example, a collider object that represents the arm of a character may be animated to continuously follow and enclose the arm as the arm itself is animated.

Figure 8:
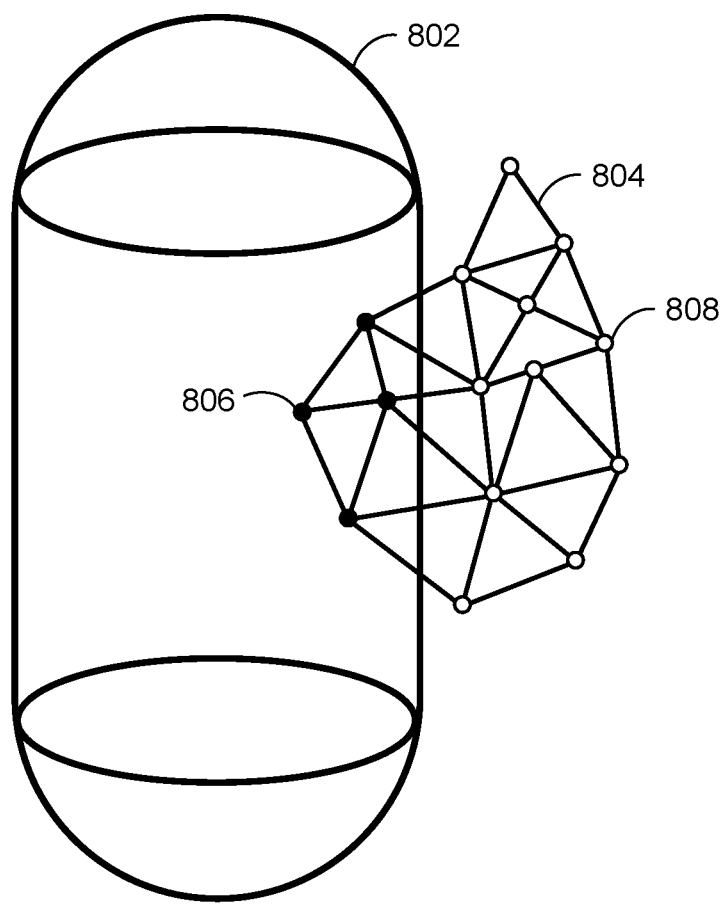
FIG. 8 is a conceptual diagram illustrating a collider object and a cloth mesh, according to one embodiment.

FIG. 8 is a conceptual diagram illustrating a collider object 802 and a cloth mesh 804, according to one embodiment. According to some embodiments, the cloth mesh 804 is a polygonal mesh comprised of vertices, edges, and faces. The collider object 802 is a three-dimensional geometric shape that encompasses an underlying object or a portion of an underlying object. The collider object 802 in FIG. 8 is a capsule collider object.

As used herein, a cloth feature can be cloth mesh vertex or a cloth mesh polygon. For each frame, locations of the cloth features (e.g., vertices or polygons) of the cloth mesh 804 are determined. To detect collisions between the cloth mesh 804 and the collider object 802, locations of the cloth features of the cloth mesh are compared to the boundary of the collider object 802. If a cloth feature of the cloth mesh 804 is located within the boundary of the collider object 802, then that cloth feature is determined as colliding with the collider object 802. In the example shown in FIG. 8, the cloth features being analyzed are cloth vertices. Cloth vertices 806 represented as black circles are determined as colliding with the collider object 802 (i.e., located within the boundary of the collider object 802) and cloth vertices 808 represented as white circles are determined as not colliding with the collider object 802 (i.e., located outside the boundary of the collider object 802).

According to one embodiment, the geometric shape that makes up the collider object is chosen such that the operation of determining whether a specific cloth feature (e.g., vertex or polygon) is colliding with the collider object is computationally simple and inexpensive, compared with determining collision with an arbitrary mesh.

Figure 9:
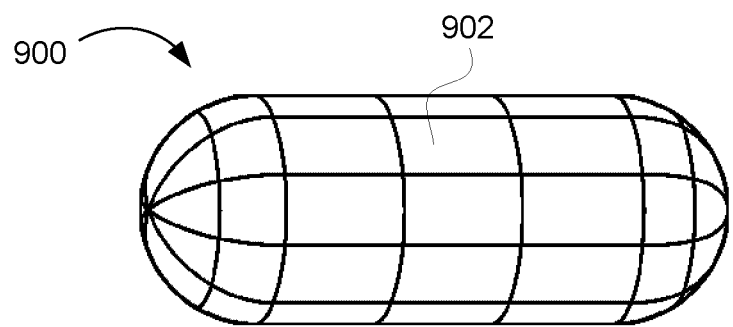
FIG. 9 is an example of a capsule collider object whose surface is divided into cells, according to one embodiment.

According to the disclosed embodiments, the surface of each collider object can be divided into a set of cells (e.g., surface elements (surfels)). FIG. 9 is an example of a capsule collider object 902 whose surface is divided into cells 902, according to one embodiment. Each cell 902 of the collider object may represent a 2D surface (e.g., triangle or quadrilateral). In some implementations, the collider object may be directly authored as a geometric shape chosen by the author. In other implementations, the body mesh that the collider object is meant to represent may be authored to include a larger number of polygons, and a mesh simplification algorithm can be executed to generate one or more collider objects whose shapes approximate the body mesh.

According to embodiments of the disclosure, the cells of the collider object are used for clustering features (e.g., vertices) of a cloth mesh and triangles of a body mesh (i.e., that the collider object represents) for purposes of performing collision detection. The number of cells into which the collider object is divided can be configurable. For example, the collider object can be divided into 256 cells. Cells can be chosen to further simplify the operation of clustering the body mesh polygons and the cloth features into them. For example, cells can be chosen such that their boundaries are aligned with the axes of particular coordinate systems.

Figure 10:
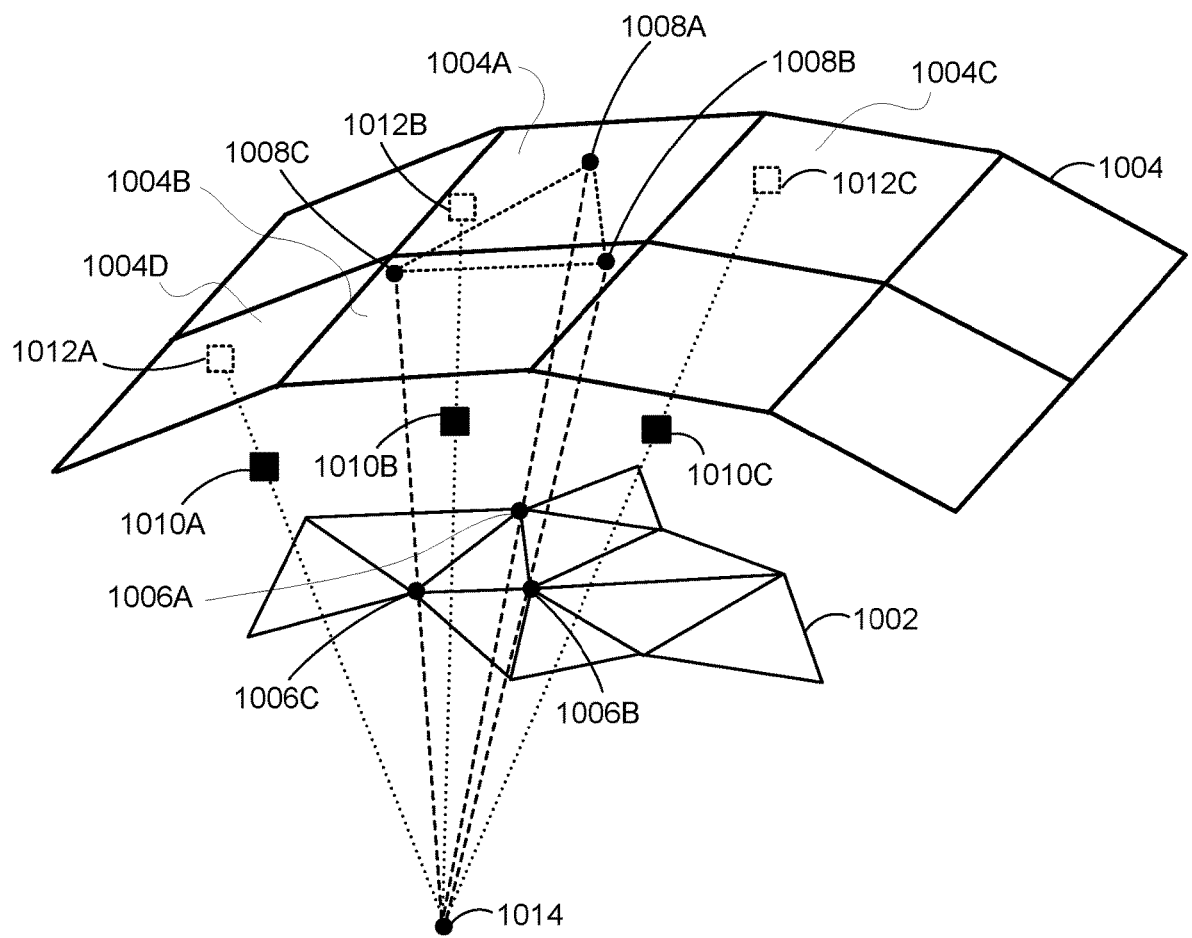
FIG. 10 is a conceptual diagram illustrating projecting cloth vertices of a cloth mesh and triangles of a body mesh into cells of a collider object, according to one embodiment.

FIG. 10 is a conceptual diagram illustrating projecting cloth vertices of a cloth mesh and triangles of a body mesh into cells of a collider object, according to one embodiment. In FIG. 10, mesh 1002 represents a portion of a body mesh, e.g., a polygonal mesh representing a character. Vertices 1010A, 1010B, 1010C represent locations of vertices of a cloth mesh to be collided against the body mesh. In FIG. 10, just three vertices 1010A, 1010B, 1010C of the cloth mesh are shown, and edges connecting the vertices 1010A, 1010B, 1010C are omitted for clarity of illustration. FIG. 10 also shows a portion of the cells 1004 that comprise a collider object used as an acceleration structure to assist with detecting collisions with the body mesh (i.e., represented by mesh 1002).

In the disclosed embodiments, the collider object fully encompasses the body mesh that it represents. As such, a projection of each polygon (e.g., triangle) of the body mesh can be made onto the collider object, for example, from a location within the collider object, such as a location at a center of the collider object. In FIG. 10, location 1014 represents the location at the center of the collider object.

In the example shown, the triangle represented by vertices 1006A-1006B-1006C is projected from location 1014 onto the surface of the collider object. The locations of the projected vertices are shown in FIG. 10 as locations 1008A-1008B-1008C corresponding to vertices 1006A-1006B-1006C, respectively.

The disclosed embodiments then identify the cells of the collider object intersected by the projected triangle of the body mesh. In the example in FIG. 10, the locations 1008A-1008B-1008C of the projected triangle overlap two cells, namely, cell 1004A and cell 1004B. In some cases, a projected triangle can overlap just one cell of the collider object, or may overlap two or more cells of the collider object.

Each triangle of the body mesh can be projected onto the surface of the collider object in the same manner to determine the cells overlapped by the various triangles of the body mesh. Once each triangle has been projected, each cell of the collider object is associated with a set of triangles that, when projected, overlap or partially overlap the cell.

Similarly, locations of cloth vertices 1010A, 1010B, 1010C of the cloth mesh are projected onto the collider object. In some embodiments, just the vertices of the cloth mesh that have been determined as falling within the boundary of the collider object are projected, as those vertices that are outside the boundary of the collider object do not collide with the collider object (or the underlying body mesh). In one implementation, the projection of the vertices of the cloth mesh onto the collider object may be from the location 1014 at the center of the collider object.

As shown in the example in FIG. 10, vertex 1010A of the cloth mesh is projected to location 1012A on the collider object, vertex 1010B of the cloth mesh is projected to location 1012B on the collider object, and vertex 1010C of the cloth mesh is projected to location 1012C on the collider object. The cell of the collider object to which a vertex of the cloth mesh is projected is then identified. In the example shown, location 1012A corresponding to vertex 1010A is identified as being located within cell 1004D, location 1012B corresponding to vertex 1010B is identified as being located within cell 1004A, and location 1012C corresponding to vertex 1010C is identified as being located within cell 1004C. Once each vertex of the cloth mesh that falls within the boundary of the collider object has been projected onto the cloth mesh, each cell of the collider object is associated with a set of cloth mesh vertices that, when projected, fall within the cell.

Table 1 is a table of the collider object cells from FIG. 10 that include the projection of the triangle defined by vertices 1006A-1006B-1006C and/or projections of vertices of the cloth mesh 1010A, 1010B, 1010C.

TABLE 1

| Cell | Triangles of body mesh that overlap the cell when projected | Vertices of cloth mesh that overlap the cell when projected |
| --- | --- | --- |
| 1004A | Triangle: vertices 1006A-1006B-1006C | 1010B |
| 1004B | Triangle: vertices 1006A-1006B-1006C | |
| 1004C | | 1010C |
| 1004D | | 1010A |

Information about each triangle of the body mesh projected onto the cells of the collider object can be stored in a data structure similar to what is shown in Table 1. For each cell, a listing of triangles that, when projected, overlap the cell is stored in the data structure.

In one embodiment, once the above-discussed data structure is generated by performing the various projections of body mesh triangles and cloth mesh vertices, each cloth vertex is tested for collision with the triangles projected onto the same cell of the collider object as the cloth vertex. In this manner, the set of triangles of the body mesh to be tested for collision detection is limited, and collision detection does not need to be performed against all triangles of the body mesh.

In some embodiments, for a given cloth vertex, in addition to performing collision detection against the triangles of the body mesh projected onto the same cell of the collider object as the projection of the cloth vertex, the triangles projected onto nearby cells of the collider object may also be checked. In one implementation, the nearest four (or any number) of other cells that are closest to the cell of the projected cloth vertex are identified. The triangles of the body mesh that are projected onto those other nearby cells can also be checked for collision detection against the cloth vertex. In another implementation, for a given cloth vertex, collision detection is checked against the triangles projected onto a given cell to which the cloth vertex is projected, as well as the triangles projected onto any cell that shares a common cell vertex or cell edge of the collider object as the given cell can also be checked (e.g., adjacent cells).

In some implementations, examining the triangles projected onto nearby or adjacent cells is done so that the set of triangles with which the cloth vertex potentially collides with does not change dramatically when the cloth vertex crosses a cell boundary from frame-to-frame, in an effort to prevent discontinuous results and jittering.

Once a given cloth vertex is determined to be potentially colliding with a body mesh triangle, a number of different collision detection methods can be applied to resolve how the cloth reacts to the collision. Many of these collision detection methods rely on information that indicates which side of the triangle should represent the "inside" of the object that the body mesh represents, and similarly which side represents the "outside".

Figure 11:
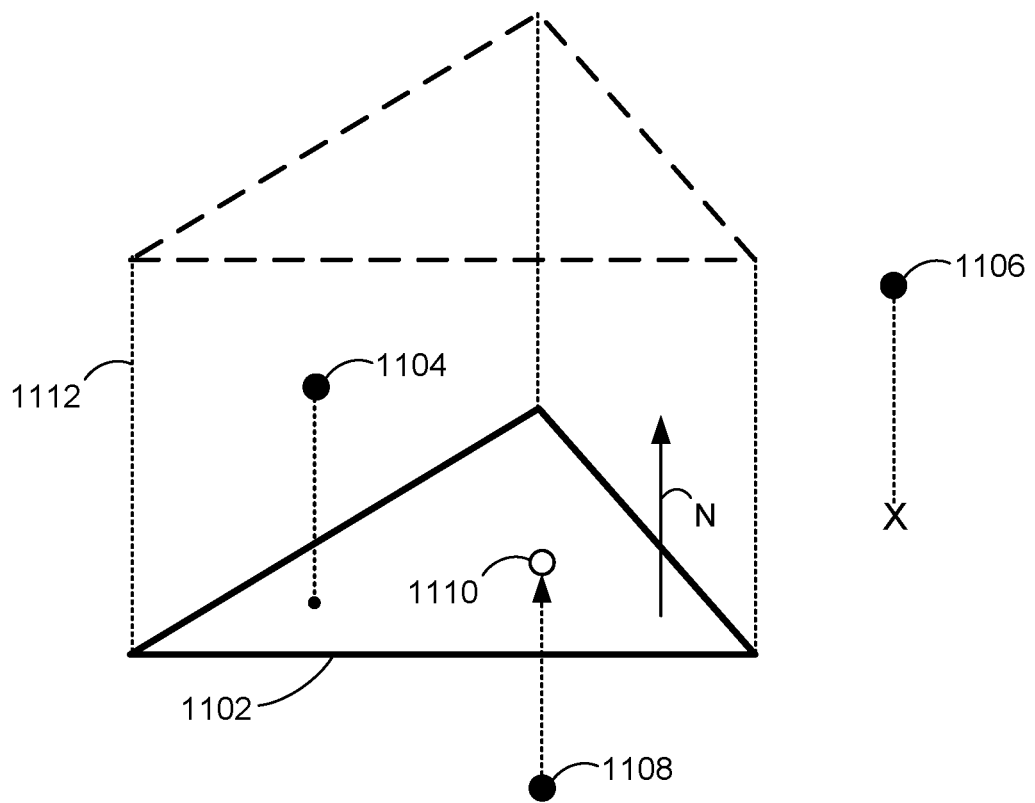
FIG. 11 is a conceptual diagram illustrating collision detection between a cloth vertex and a triangle of a body mesh, according to one embodiment.

FIG. 11 is a conceptual diagram illustrating collision detection between a cloth vertex and a triangle of a body mesh, according to one embodiment. In FIG. 11, triangle 1102 is one triangle of a body mesh, such as a body mesh of a character. Cloth vertices 1104, 1106, 1108 are vertices of a cloth mesh to be collided against the body mesh. As described above, for a given cloth vertex of the cloth mesh, a subset of triangles of the body mesh to test for collision detection can be identified by using cells of a collider object as an acceleration structure. In the example in FIG. 11, each of vertices 1104, 1106, 1108 has been identified for collision detection testing against triangle 1102.

Triangle 1102 is associated a face normal N. The triangle 1102 is part of a body mesh that is fully encompassed by a collider object, as described above. As such, since the surface of the collider object is "outside" the body mesh, the orientation of the triangle 1102 is known, so that it can be determined which side of the triangle 1102 is "outside" the body represented by the body mesh, and which side of the triangle 1102 is "inside" the body. In the example shown, the upwards direction corresponding to the surface normal N is "outside" the body, and the downwards direction is "inside" the body.

One embodiment of the collision detection methods can analyze the volume swept by the triangle in the direction of its normal. When performing a collision detection between cloth vertex 1106 and the triangle 1102 in this fashion, the collision detection result identifies no collision, as the cloth vertex 1106 is outside the volume 1112 corresponding to projecting the triangle 1102 in the direction of the face normal N. Although just the upwards direction of the volume 1112 corresponding to projecting the triangle 1102 in the direction of the face normal N is shown, the triangle can be projected in both directions, including in the opposite direction of face normal N.

When performing a collision detection between cloth vertex 1104 and the triangle 1102, the collision detection result also identifies no collision, as the cloth vertex 1104 is above the face of the triangle 1102, i.e., "outside" the body of the body mesh corresponding to the triangle 1102.

When performing a collision detection between cloth vertex 1108 and the triangle 1102, the collision detection result identifies a collision, as the cloth vertex 1108 is below the face of the triangle 1102 (i.e., "inside" the body of the body mesh corresponding to the triangle 1102) and within the volume 1112 of projecting the triangle 1102 along the direction of the face normal N (i.e., in the downwards direction of the projection).

Once the collision detection is performed, and the vertex 1108 is determined to be colliding with the triangle 1102, a number of different collision handling methods can be applied.

In one embodiment of a collision handling method, the vertex 1108 is moved in the direction of the face normal N to the face of triangle 1102. In another embodiment, the vertex 1108 is moved in the direction of projecting the vertex from a center of the collider object (see, e.g., location 1014 in FIG. 10) to the face of triangle 1102. In another embodiment, the vertex 1108 is moved to a closest point on the triangle 1102, wherein the closest point is on the face of the triangle 1102, on an edge of the triangle 1102, or at a vertex of the triangle 1102.

The process shown in FIG. 11 is repeated for each cloth vertex within the boundary of the collider object to determine whether the cloth vertex collides with any of the limited set of triangles of the body mesh to be tested for collision, and to handle the collision if it is detected.

In real-time applications, such as video games, the body mesh can change and be deformed from frame-to-frame, so the cloth mesh can be deformed by the collision detection in accordance with the disclosed embodiments as the body mesh is deformed during gameplay.

Figure 12:
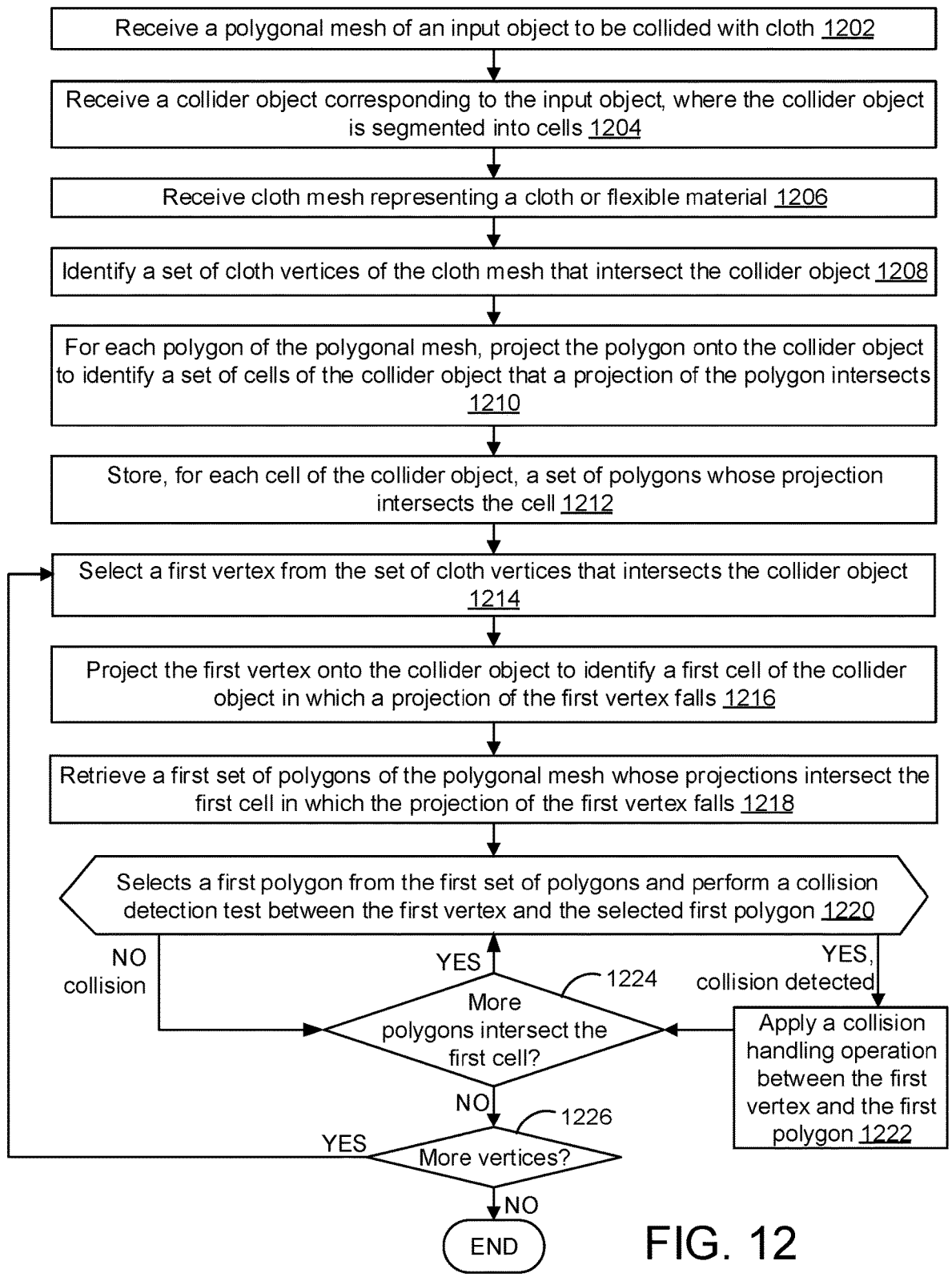
FIG. 12 is a flow diagram of method steps for cloth simulation, according to one embodiment.

FIG. 12 is a flow diagram of method steps for cloth simulation, according to one embodiment. In various implementations, the method can be performed by the processor 110, the graphics processor 116, or a combination of the processor 110 and the graphics processor 116.

As shown, the method begins at step 1202, where the processor receives a polygonal mesh of an input object to be collided with cloth. As described, the polygonal mesh may correspond to an artist-authored input object, such as a human-like character.

At step 1204, the processor receives a collider object corresponding to the input object, where the collider object is segmented into cells. As described, the collider object may be an artist-authored object that is a simpler geometric shape that represents or approximates the polygonal mesh of the input object. The collider object may also be authored such that the polygonal mesh of the input object is fully enclosed within the collider object. In some embodiments, the collider object is divided into a set of cells, where each cell is a 2D shape (e.g., triangle or quadrilateral). In one example implementation, the collider object is divided into 256 cells, although any number of cells is within the scope of the disclosure. Also, in some embodiments, the polygonal mesh of the input object may be associated with two or more collider objects.

At step 1206, the processor receives cloth mesh representing a cloth or flexible material. As described, the cloth mesh is also a polygonal mesh representing a cloth object. In some embodiments, the cloth mesh is artist-authored.

At step 1208, the processor identifies a set of cloth vertices of the cloth mesh that intersect the collider object. Although the method in FIG. 12 is described using a set of cloth vertices that intersect the collider object, other embodiments involve using a set of cloth features that intersect the collider object, such as polygons of the cloth mesh. For each cloth vertex of the cloth mesh, a location of the cloth vertex is analyzed to determine whether the cloth vertex falls within the boundary of the collider object. Any cloth vertices that fall outside the boundary of the collider object can be discarded, as there is no collision. The set of cloth vertices of the cloth mesh that intersect the collider object (i.e., fall within the boundary of the collider object) are further analyzed for collision detection.

At step 1210, for each polygon of the polygonal mesh, the processor projects the polygon onto the collider object to identify a set of cells of the collider object that a projection of the polygon intersects. Each cell of the set of cells that the projected polygon intersects can be labelled as including the projection of the polygon. As described above in FIG. 10, each polygon of the polygonal mesh of the input object can be projected from a location within the collider object, such as a center of the collider object. Since the polygonal mesh is fully enclosed by the collider object, the projection of the polygon will overlap one or more cells of the collider object.

At step 1212, after each polygon of the polygonal mesh is projected, the processor stores, for each cell of the collider object, a set of polygons whose projections at least partially overlap the cell of the collider object.

At step 1214, the processor selects a first vertex from the set of cloth vertices that intersects the collider object.

At step 1216, the processor projects the first vertex onto the collider object to identify a first cell of the collider object in which a projection of the first vertex falls. As described above in FIG. 10, each cloth vertex of the cloth mesh can be projected from a location within the collider object, for example, from a location at a center of the collider object. Since the vertices in the set of vertices have already been identified as being within the boundary of the collider object, the projection of the cloth vertex will overlap a cell of the collider object.

At step 1218, the processor retrieves a first set of polygons of the polygonal mesh (i.e., stored in step 1212) whose projections intersect the first cell in which the projection of the first vertex falls on the collider object.

At step 1220, the processor selects a first polygon from the first set of polygons and performs a collision detection test between the first vertex and the selected first polygon. In some embodiments, the first vertex is identified as colliding with the polygonal mesh if the first vertex is located beneath (or "inside") the face of the first polygon and is within a volume corresponding to projecting the face of the first polygon in a direction of the face normal of the polygon.

If, at step 1120, the processor detects no collision for the first vertex and the first polygon, then the method proceeds to step 1224.

At step 1224, the processor determines whether there are any more polygons in the first set of polygons whose projections intersect the first cell (i.e., the same cell to which the first vertex is projected). If more polygons are left to be tested, the method returns to step 1220, where another polygon from the first set of polygons is selected and tested for collision with the first vertex. If no more polygons are left to be tested, the method proceeds to step 1226. In some embodiments, in addition to testing the first vertex for collision against the first set of polygons of the polygonal mesh whose projections intersect the first cell, additional polygons of the polygonal mesh can be tested whose projections intersect adjacent or nearby cells of the first cell.

If, at step 1220, the collision detection test determines that the first vertex collides with the first polygon, the processor proceeds to step 1222, where the processor applies a collision handling operation between the first vertex and the first polygon. In one embodiment, in the collision handling operation, the first vertex is moved in a direction of the face normal of the collided polygon to the surface of the collided polygon. In another embodiment, the first vertex is moved in a direction of projecting the first vertex from a location at a center of the collider object to the surface of the collided polygon. In another embodiment, the first vertex is moved to a closest point on the collided polygon, where the closest point is on the face, on an edge, or at a vertex of the collided polygon. After step 1222, the method proceeds to step 1224, described above, where the processor determines whether there are any more polygons in the first set of polygons whose projections intersect the first cell (i.e., the same cell to which the first vertex is projected).

At step 1226, the processor determines whether there are any more cloth vertices in the set of cloth vertices left to process. If yes, the method returns to step 1214 to select another vertex. If no, all cloth vertices have been processed and the method terminates.

In one embodiment of the method, the collision handling operation at step 1222 can be applied to the entire set of polygons intersecting the cell, instead of to each polygon individually, for example by detecting the one best polygon to interact with.

In sum, embodiments of the disclosure provide a technique for cloth simulation where a collider object corresponding to a body mesh is used as an acceleration structure to limit the number of polygons of the body mesh to be checked for collision detection with a cloth mesh. The disclosed embodiments can be implemented on a GPU, which is highly parallelized, and can therefore process many cloth vertices simultaneously. Accordingly, higher quality cloth simulation can be achieved in real-time compared to existing approaches.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for cloth simulation, the method comprising:
   receiving, by one or more processors, an input mesh, wherein the input mesh comprises a polygonal mesh that is a computer representation of a three-dimensional (3D) object;
   receiving, by the one or more processors, a collider object, wherein the input mesh is fully enclosed by the collider object, and wherein a surface of the collider object is divided into a plurality of cells;
   receiving, by the one or more processors, a cloth mesh, wherein the cloth mesh comprises a polygonal mesh that is a computer representation of a flexible material;
   identifying, by the one or more processors, a set of cloth features of the cloth mesh that intersect the collider object, wherein identifying the set of cloth features of the cloth mesh that intersect the collider object comprises:
   for each cloth feature of the cloth mesh, determining whether the cloth feature is enclosed by the surface of the collider object; and
   identifying the set of cloth features of the cloth mesh that intersect the collider object as the cloth features that are enclosed by the surface of the collider object;
   for each polygon of the input mesh, projecting, by the one or more processors, the polygon onto the surface of the collider object to identify a set of cells of the plurality of cells of the collider object that a projection of the polygon intersects;
   for each cloth feature in the set of cloth features that intersects the collider object, projecting, by the one or more processors, the cloth feature onto the surface of the collider object to identify a cell of the collider object that a projection of the cloth feature intersects, wherein the cell is added to a set of cells of the collider object identified as including a projection of at least one cloth feature;
   selecting, by the one or more processors, a first cell of the plurality of cells of the collider object that is from the set of cells of the collider object identified as including a projection of at least one cloth feature, wherein the first cell is also associated with a set of polygons of the input mesh whose projections intersect the first cell;
   performing, by the one or more processors, collision detection between the at least one cloth feature and the polygons in the set of polygons of the input mesh whose projections intersect the first cell to identify a first polygon collided with the at least one feature; and
   performing, by the one or more processors, a collision handling operation between the at least one vertex and the first polygon.

2. The method according to claim 1, wherein, for each polygon of the input mesh, projecting the polygon onto the surface of the collider object to identify the set of cells of the plurality of cells of the collider object that the projection of the polygon intersects comprises:
    projecting vertices of the polygon from a location within the collider object towards the surface of the collider object to identify projected locations of the vertices of the polygon on the surface of the collider object; and
    identifying the set of cells of the plurality of cells of the collider object that the projection of the polygon intersects based on the projected locations of the vertices of the polygon.

3. The method according to claim 1, wherein, for each cloth feature in the set of cloth features that intersects the collider object, projecting the cloth feature onto the surface of the collider object to identify the cell of the collider object that the projection of the cloth feature intersects comprises:
    projecting the cloth feature from a location within the collider object towards the surface of the collider object to identify a projected location of the cloth feature on the surface of the collider object; and
    identifying the cell of the collider object that the projection of the cloth feature intersects based on the projected location of the cloth feature.

4. The method according to claim 1, wherein performing the collision handling operation comprises:
    moving a location of the at least one feature to an updated location on a face of the first polygon in a direction of a face normal of the first polygon; or
    moving a location of the at least one vertex to an updated location on a face of the first polygon in a direction of projecting the at least one feature from a location at a center of the collider object towards the surface of the collider object; or
    moving a location of the at least one feature to a closest point on the first polygon, wherein the closest point is on the face of the first polygon, on an edge of the first polygon, or at a vertex of the first polygon.

5. The method according to claim 1, further comprising:
    identifying one or more cells of the plurality of cells adjacent to the first cell; and
    performing collision detection between the at least one cloth feature whose projections intersect the first cell and polygons of the input mesh whose projections intersect the one or more cells of the plurality of cells adjacent to the first cell.

6. The method according to claim 1, wherein the collider object comprises a box collider object, a sphere or spheroid collider object, or a capsule collider object.

7. A non-transitory computer-readable storage medium storing instructions that, when executed by one or more processors, causes a computing device to perform cloth simulation, by performing the steps of:
    receiving an input mesh, wherein the input mesh comprises a polygonal mesh that is a computer representation of a three-dimensional (3D) object;
    receiving a collider object, wherein the input mesh is fully enclosed by the collider object, and wherein a surface of the collider object is divided into a plurality of cells;
    receiving a cloth mesh, wherein the cloth mesh comprises a polygonal mesh that is a computer representation of a flexible material;
    identifying a set of cloth features of the cloth mesh that intersect the collider object, wherein identifying the set of cloth features of the cloth mesh that intersect the collider object comprises:
        for each cloth feature of the cloth mesh, determining whether the cloth feature is enclosed by the surface of the collider object; and
        identifying the set of cloth features of the cloth mesh that intersect the collider object as the cloth features that are enclosed by the surface of the collider object;
    for each polygon of the input mesh, projecting the polygon onto the surface of the collider object to identify a set of cells of the plurality of cells of the collider object that a projection of the polygon intersects;
    for each cloth feature in the set of cloth features that intersects the collider object, projecting the cloth feature onto the surface of the collider object to identify a cell of the collider object that a projection of the cloth feature intersects, wherein the cell is added to a set of cells of the collider object identified as including a projection of at least one cloth feature;
    selecting a first cell of the plurality of cells of the collider object that is from the set of cells of the collider object identified as including a projection of at least one cloth feature, wherein the first cell is also associated with a set of polygons of the input mesh whose projections intersect the first cell;
    performing collision detection between the at least one cloth feature and the polygons in the set of polygons of the input mesh whose projections intersect the first cell to identify a first polygon collided with the at least one feature; and
    performing a collision handling operation between the at least one vertex and the first polygon.

8. The computer-readable storage medium according to claim 7, wherein, for each polygon of the input mesh, projecting the polygon onto the surface of the collider object to identify the set of cells of the plurality of cells of the collider object that the projection of the polygon intersects comprises:
    projecting vertices of the polygon from a location within the collider object towards the surface of the collider object to identify projected locations of the vertices of the polygon on the surface of the collider object; and
    identifying the set of cells of the plurality of cells of the collider object that the projection of the polygon intersects based on the projected locations of the vertices of the polygon.

9. The computer-readable storage medium according to claim 7, wherein, for each cloth feature in the set of cloth features that intersects the collider object, projecting the cloth feature onto the surface of the collider object to identify the cell of the collider object that the projection of the cloth feature intersects comprises:
    projecting the cloth feature from a location within the collider object towards the surface of the collider object to identify a projected location of the cloth feature on the surface of the collider object; and
    identifying the cell of the collider object that the projection of the cloth feature intersects based on the projected location of the cloth feature.

10. The computer-readable storage medium according to claim 7, wherein performing the collision handling operation comprises:
    moving a location of the at least one feature to an updated location on a face of the first polygon in a direction of a face normal of the first polygon; or
    moving a location of the at least one vertex to an updated location on a face of the first polygon in a direction of projecting the at least one feature from a location at a center of the collider object towards the surface of the collider object; or
    moving a location of the at least one feature to a closest point on the first polygon, wherein the closest point is on the face of the first polygon, on an edge of the first polygon, or at a vertex of the first polygon.

11. The computer-readable storage medium according to claim 7, the steps further comprising:
identifying one or more cells of the plurality of cells adjacent to the first cell; and
performing collision detection between the at least one cloth feature whose projections intersect the first cell and polygons of the input mesh whose projections intersect the one or more cells of the plurality of cells adjacent to the first cell.

12. The computer-readable storage medium according to claim 7, wherein the collider object comprises a box collider object, a sphere or spheroid collider object, or a capsule collider object.

13. A device for performing cloth simulation, the device comprising:
a memory storing instructions; and
one or more processors configured to the execute the instructions to cause the device to:
receive an input mesh, wherein the input mesh comprises a polygonal mesh that is a computer representation of a three-dimensional (3D) object;
receive a collider object, wherein the input mesh is fully enclosed by the collider object, and wherein a surface of the collider object is divided into a plurality of cells;
receive a cloth mesh, wherein the cloth mesh comprises a polygonal mesh that is a computer representation of a flexible material;
identify a set of cloth features of the cloth mesh that intersect the collider object, wherein identifying the set of cloth features of the cloth mesh that intersect the collider object comprises:
for each cloth feature of the cloth mesh, determining whether the cloth feature is enclosed by the surface of the collider object; and
identifying the set of cloth features of the cloth mesh that intersect the collider object as the cloth features that are enclosed by the surface of the collider object;
for each polygon of the input mesh, project the polygon onto the surface of the collider object to identify a set of cells of the plurality of cells of the collider object that a projection of the polygon intersects;
for each cloth feature in the set of cloth features that intersects the collider object, project the cloth feature onto the surface of the collider object to identify a cell of the collider object that a projection of the cloth feature intersects, wherein the cell is added to a set of cells of the collider object identified as including a projection of at least one cloth feature;
select a first cell of the plurality of cells of the collider object that is from the set of cells of the collider object identified as including a projection of at least one cloth feature, wherein the first cell is also associated with a set of polygons of the input mesh whose projections intersect the first cell;
perform collision detection between the at least one cloth feature and the polygons in the set of polygons of the input mesh whose projections intersect the first cell to identify a first polygon collided with the at least one feature; and
perform a collision handling operation between the at least one vertex and the first polygon.

14. The device according to claim 13, wherein, for each polygon of the input mesh, projecting the polygon onto the surface of the collider object to identify the set of cells of the plurality of cells of the collider object that the projection of the polygon intersects comprises:
projecting vertices of the polygon from a location within the collider object towards the surface of the collider object to identify projected locations of the vertices of the polygon on the surface of the collider object; and
identifying the set of cells of the plurality of cells of the collider object that the projection of the polygon intersects based on the projected locations of the vertices of the polygon.

15. The device according to claim 13, wherein, for each cloth feature in the set of cloth features that intersects the collider object, projecting the cloth feature onto the surface of the collider object to identify the cell of the collider object that the projection of the cloth feature intersects comprises:
projecting the cloth feature from a location within the collider object towards the surface of the collider object to identify a projected location of the cloth feature on the surface of the collider object; and
identifying the cell of the collider object that the projection of the cloth feature intersects based on the projected location of the cloth feature.

16. The device according to claim 13, wherein performing the collision handling operation comprises:
moving a location of the at least one feature to an updated location on a face of the first polygon in a direction of a face normal of the first polygon; or
moving a location of the at least one vertex to an updated location on a face of the first polygon in a direction of projecting the at least one feature from a location at a center of the collider object towards the surface of the collider object; or
moving a location of the at least one feature to a closest point on the first polygon, wherein the closest point is on the face of the first polygon, on an edge of the first polygon, or at a vertex of the first polygon.

17. The device according to claim 13, wherein the one or more processors executing the instructions further causes the device to:
identify one or more cells of the plurality of cells adjacent to the first cell; and
perform collision detection between the at least one cloth feature whose projections intersect the first cell and polygons of the input mesh whose projections intersect the one or more cells of the plurality of cells adjacent to the first cell.

* * * * *